United States Patent
Yang et al.

(10) Patent No.: US 12,471,502 B2
(45) Date of Patent: Nov. 11, 2025

(54) HIGH QUALITY QUANTUM COMPUTER COMPONENTS

(71) Applicant: Applied Materials, Inc., Santa Clara, CA (US)

(72) Inventors: Zihao Yang, Cupertino, CA (US); Mingwei Zhu, San Jose, CA (US); Lan Yu, Voorheesville, NY (US); Zhebo Chen, San Jose, CA (US); Robert Jan Visser, Menlo Park, CA (US); Nag Patibandla, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 497 days.

(21) Appl. No.: 17/898,880

(22) Filed: Aug. 30, 2022

(65) Prior Publication Data
US 2023/0263075 A1 Aug. 17, 2023

Related U.S. Application Data

(60) Provisional application No. 63/311,314, filed on Feb. 17, 2022.

(51) Int. Cl.
*H10N 60/01* (2023.01)
*G06N 10/40* (2022.01)
*H10N 60/80* (2023.01)

(52) U.S. Cl.
CPC ......... *H10N 60/0912* (2023.02); *G06N 10/40* (2022.01); *H10N 60/805* (2023.02)

(58) Field of Classification Search
None
See application file for complete search history.

(56) References Cited

U.S. PATENT DOCUMENTS

| | | |
|---|---|---|
| 9,082,927 B1 | 7/2015 | Pramanik et al. |
| 9,281,463 B2 | 3/2016 | Greer et al. |
| 9,425,376 B2 | 8/2016 | Greer et al. |
| 2015/0179916 A1* | 6/2015 | Pramanik ............... H10N 60/12 505/190 |
| 2015/0179918 A1* | 6/2015 | Greer ................. H10N 60/0912 204/192.32 |

FOREIGN PATENT DOCUMENTS

| | | |
|---|---|---|
| JP | 2010056218 A | 3/2010 |
| KR | 101831545 B1 | 2/2018 |

OTHER PUBLICATIONS

Application No. PCT/US2023/012718, International Search Report and the Written Opinion, Mailed On Mar. 18, 2024, 8 pages.

* cited by examiner

*Primary Examiner* — Kaj K Olsen
*Assistant Examiner* — Pradhuman Parihar
(74) *Attorney, Agent, or Firm* — Kilpatrick Townsend & Stockton LLP

(57) ABSTRACT

Exemplary methods of fabricating high quality quantum computing components are described. The methods include removing native oxide from a deposition surface of a silicon substrate in a cleaning chamber of a processing system, and transferring the silicon substrate under vacuum to a deposition chamber of the processing system. The methods further include depositing an aluminum layer on the deposition surface of the silicon substrate in the deposition chamber, where an interface between the aluminum layer and the deposition surface of the silicon substrate is oxygen free.

13 Claims, 11 Drawing Sheets

FIG. 10A
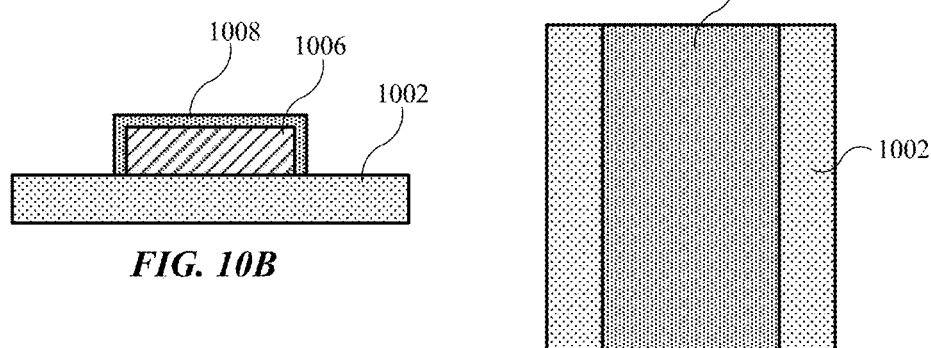
FIG. 10B
FIG. 10C
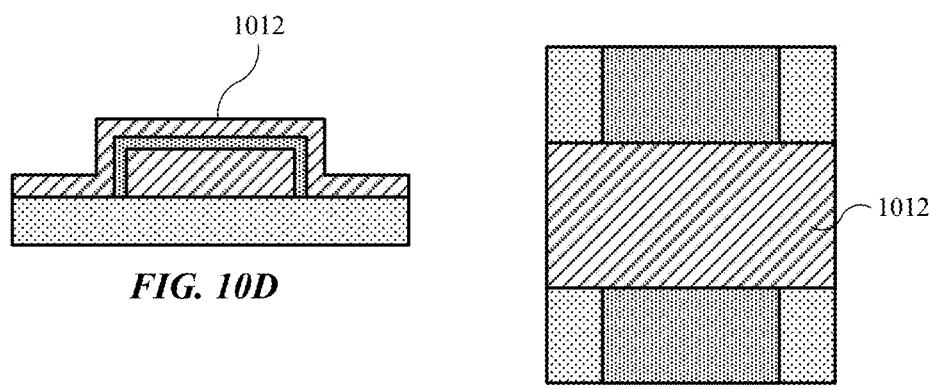
FIG. 10D
FIG. 10E
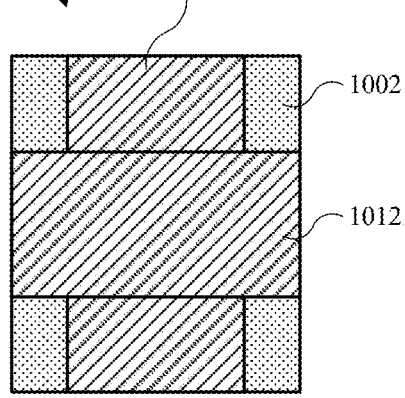
FIG. 10F

HIGH QUALITY QUANTUM COMPUTER COMPONENTS

CROSS-REFERENCE TO RELATED APPLICATIONS

This application claims the benefit of, and priority to U.S. Provisional Application Ser. No. 63/311,314, filed Feb. 17, 2022, which is hereby incorporated by reference in its entirety for all purposes.

TECHNICAL FIELD

The present technology relates to high quality quantum computer components and methods of making them. More specifically, the present technology relates to quantum computer components with reduced defect densities that enhance computational performance.

BACKGROUND

Integrated circuits are made possible by processes which produce intricately patterned material layers on substrate surfaces. Producing patterned material on a substrate requires controlled methods for forming and removing material. Material characteristics may affect how the device operates and may also affect how the films are removed relative to one another. Plasma-enhanced deposition may produce films having certain characteristics. Many films that are formed require additional processing to adjust or enhance the material characteristics of the film to provide suitable properties.

Thus, there is a need for improved systems and methods that can be used to produce high quality devices and structures. These and other needs are addressed by the present technology.

SUMMARY

Embodiments of the present technology include processing methods to form a device component. The methods include removing native oxide from a deposition surface of a silicon substrate in a cleaning chamber of a processing system, and transferring the silicon substrate under vacuum to a deposition chamber of the processing system. The methods further include depositing an aluminum layer on the deposition surface of the silicon substrate in the deposition chamber, where an interface between the aluminum layer and the deposition surface of the silicon substrate is oxygen free.

In additional embodiments, the methods also include providing a pretreated silicon substrate to a degassing chamber of the processing system, to form a degassed silicon substrate. The degassed silicon substrate is transferred under vacuum to a cooling chamber of the processing system to cool the silicon substrate, and transferred again under vacuum to the cleaning chamber of the processing system. In further embodiments, the methods may also include forming a patterned photoresist layer on the aluminum layer, where the patterned photoresist layer includes patterned openings that provide access to an exposed portion of the aluminum layer. The exposed portion of the aluminum layer is removed down to the underlying silicon substrate to form a patterned aluminum layer, and the patterned photoresist is removed from the patterned aluminum layer. In still further embodiments, the methods include forming the patterned aluminum layer into the device component, where the device component is a co-planar waveguide resonator. In yet additional embodiments, the methods include providing the silicon substrate with the patterned aluminum layer to the cleaning chamber of the processing system to remove native aluminum oxide from an exposed surface of the patterned aluminum layer, where the removal of the native aluminum oxide forms a cleaned patterned aluminum layer that is free of oxygen on the exposed surface of the patterned aluminum layer. The silicon substrate with the cleaned patterned aluminum layer is transferred under vacuum to the deposition chamber of the processing system. The methods further include forming an aluminum oxide layer on the cleaned patterned aluminum layer in the deposition chamber. A second aluminum layer is formed on the aluminum oxide layer in the deposition chamber. The silicon substrate stays in the deposition chamber for both the forming of the aluminum oxide layer and the forming of the second aluminum layer. In more embodiments, the second aluminum layer is also formed directly on the silicon substrate, where the interface between the second aluminum layer and the silicon substrate is oxygen free. In still more embodiments, the methods include forming the silicon substrate having the second aluminum layer into a device component, where the device component is a Josephson Junction.

Embodiments of the present technology include additional processing methods to form device components. These methods include removing a native oxide from a deposition surface of a silicon substrate in a cleaning chamber of the processing system and transferring the silicon substrate under vacuum to a deposition chamber of the processing system. The methods also include depositing a first aluminum layer on the deposition surface of the silicon substrate in the deposition chamber, where an interface between the first aluminum layer and the deposition surface of the silicon substrate is oxygen free. The methods still further include patterning the first aluminum layer to form a first patterned aluminum layer, and forming and patterning a patterned dielectric layer on the first patterned aluminum layer and the silicon substrate. An aluminum oxide layer is formed on the first patterned aluminum layer, where the aluminum oxide layer is not formed on the first patterned aluminum layer that is covered by the patterned dielectric layer. A second aluminum layer is formed on the aluminum oxide layer and the patterned dielectric layer, where the silicon substrate stays in the deposition chamber for both the forming of the aluminum oxide layer and the forming of the second aluminum layer. The methods additionally include removing the patterned dielectric layer from the silicon substrate, where the removal of the patterned dielectric layer forms a second patterned aluminum layer from the second aluminum layer.

In additional embodiments, the second aluminum layer is also formed directly on the silicon substrate, where an interface between the second aluminum layer and the silicon substrate is oxygen free. In further embodiments, the methods may include forming the silicon substrate having the second aluminum layer into the device component, where the device component is a Josephson Junction. In still further embodiments, the first aluminum layer and the second aluminum layer are formed by physical vapor deposition. In additional embodiments, the patterning of the first aluminum layer to form the first patterned aluminum layer includes reactive ion etching of the first aluminum layer. In yet additional embodiments, the dielectric layer includes a silicon oxide or silicon nitride layer that is formed on the first patterned aluminum layer by physical vapor deposition or flowable chemical vapor deposition. In more embodiments, the patterning of the first aluminum layer includes forming and photoresist layer on the first aluminum layer and patterning the first photoresist layer, where the photoresist layer includes a carbon-containing hardmask.

Embodiments of the present technology still further include device component structures. The device component structures include a silicon substrate and a first patterned aluminum layer positioned on the silicon substrate. An interface between the patterned aluminum layer and the silicon substrate is oxygen free.

In additional embodiments, the silicon substrate includes a silicon wafer with a volume resistivity of greater than or about 3000 Ωcm. In further embodiments, the first patterned aluminum layer is characterized by a thickness of less than or about 100 nm. In still further embodiments, a first aluminum oxide layer is positioned on at least a portion of the first patterned aluminum layer, where the first aluminum oxide layer has a thickness of less than or about 2 nm. In yet additional embodiments, the device component structures further include a second patterned aluminum oxide layer positioned on the first aluminum oxide layer and a portion of the silicon substrate, where a second interface between the second patterned aluminum layer and the silicon substrate is oxygen free. In more embodiments, the device component structures form at least a portion of a device component selected from the group consisting of a coplanar waveguide resonator and a Josephson Junction.

Such technology may provide numerous benefits over conventional fabrication methods to make quantum computing components. The reduced number of oxygen sites at the interfaces between the silicon substrate and the aluminum layers reduces the number of two-level-system (TLS) defects at the interfaces that can destabilize qubits during calculations. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

FIGS. 10A-F show cross-sectional and birds-eye views of the development of a portion of another exemplary quantum computing component structure according to embodiments of the present technology.

Figure 1:
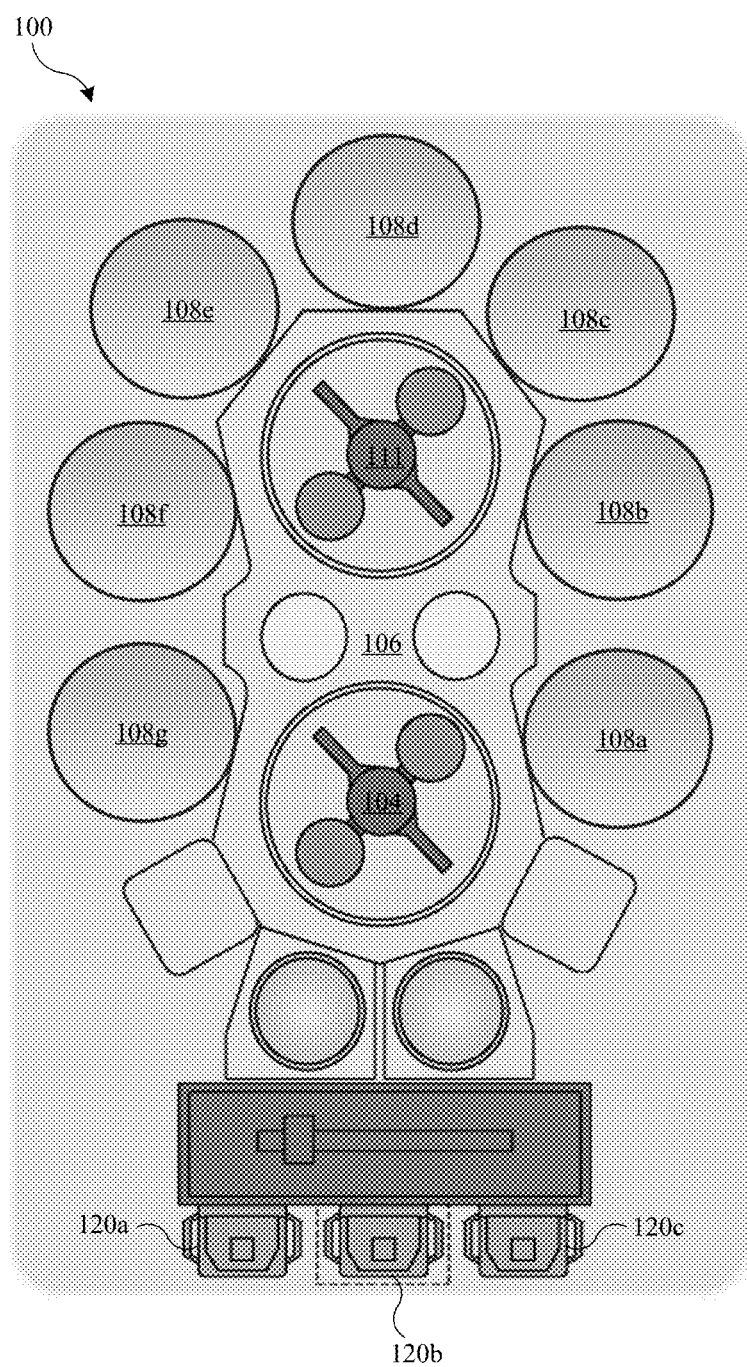
FIG. 1 shows a top plan view of an exemplary processing system according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

Quantum computers store and process information in the form of quantum bits or "qubits." Keeping these qubits stable during computations is a major challenge that limits the use of quantum computers to solve complex computational problems. Superconducting (SC)-based qubit technology is regarded as one of the most promising and scalable approaches to creating, maintaining, and manipulating large numbers of stable qubits. The solid-state nature of SC-based qubit technology has increased qubit number and qubit fidelity in quantum computers and allowed quantum computing to hit development milestones toward realizing the goal of a fault-tolerant quantum computer.

SC-based qubit technology creates, stores, and manipulates superconducting qubits called transmons, which can be thought of as anharmonic oscillators that can be controlled and interrogated by external radio-frequency signals. SC-based quantum computers can include device component structures such as Josephson junctions (JJs), coplanar waveguide (CPW) resonators, rf feedlines, and quantum busbars, among other components. Precise fabrication of the structures and materials in these quantum computer components reduces the number of defects that can cause the transmons to become unstable. In the terminology of quantum computing, these defects can create "two-level-system" (TLS) defects that can redirect a qubit from a stable state that can perform computational tasks into a decoherent, unstable state that looses computational information.

The present technology addresses problems with the high density of TLS defects in SC-based quantum computer components. Embodiments of the present technology include methods of fabricating SC-based quantum computer components with oxygen-free interfaces between a metal layer, such as an aluminum layer, and a substrate. The lack of oxygen sites at these interfaces reduces the number of TLS defects in the component that can cause a SC-based qubit to become unstable. Embodiments of the present technology also include fabrication systems that can transport substrates and partially formed device components under vacuum from one processing chamber to another. Transporting these components under vacuum prevents oxygen from reacting with cleaned, oxygen-free surfaces before additional layers are formed on those surfaces. This provides an oxygen-free interface between the layers that reduces the number of TLS defects at the interface. Embodiments of the present technology still also include performing two or more fabrication operations in the same processing chamber without breaking vacuum between the operations. In embodiments, a partially formed device component may stay in the same processing chamber for the formation of a layer of a first material followed by the formation of a layer of a second material on the layer of the first material without breaking vacuum between the formation operations. In additional embodiments, the removal of a portion of a first layer to form a patterned first layer may be followed by the deposition of a second layer on the patterned first layer without breaking vacuum between the removal and formation operations. In these and other embodiments, oxygen, particulates, and other contaminants, are prevented from contacting the device component between the operations.

FIG. 1 shows a top plan view of an embodiment of a processing system 100 according to embodiments of the present technology. In embodiments, the processing system 100 may include processing chambers operable to perform one or more processing operations such as cleaning, degassing, cooling, deposition, treatment, etching, patterning, baking, and curing, among other processing operations. As shown in FIG. 1, a group of front opening unified pods 102a-c supply substrates of a variety of sizes that are received by robotic arms 104 and placed into a low pressure holding area 106 before being placed into one of the processing chambers 108a-gd. A second robotic arm 111 may be used to transport the substrate wafers from the holding area 106 to the processing chambers 108a-f and back. Each processing chamber 108a-g, can be outfitted to perform one or more processing operation, such as the processing operations described herein. In embodiments, the processing chambers 108a-g may be configured to perform one or more cleaning, degassing, cooling, deposition, treatment, etching, patterning, baking, and curing operations, among other operations. In further embodiments, the one or more of the processing operations may be configured to perform plasma-enhanced chemical vapor deposition, atomic layer deposition, physical vapor deposition, etching, pre-cleaning, degassing, orientation, annealing, ashing, and other processing operations, to form one or more portions of a device component that can be incorporated into a SC-based quantum computer. The configuration of the processing chambers 108a-g shown in FIG. 1 represents an embodiment of a processing system 100 to make the device components. Is should be appreciated that additional configurations and arrangements of the positions and functionality of the processing chambers are contemplated by additional embodiments of the present technology.

Figure 2:
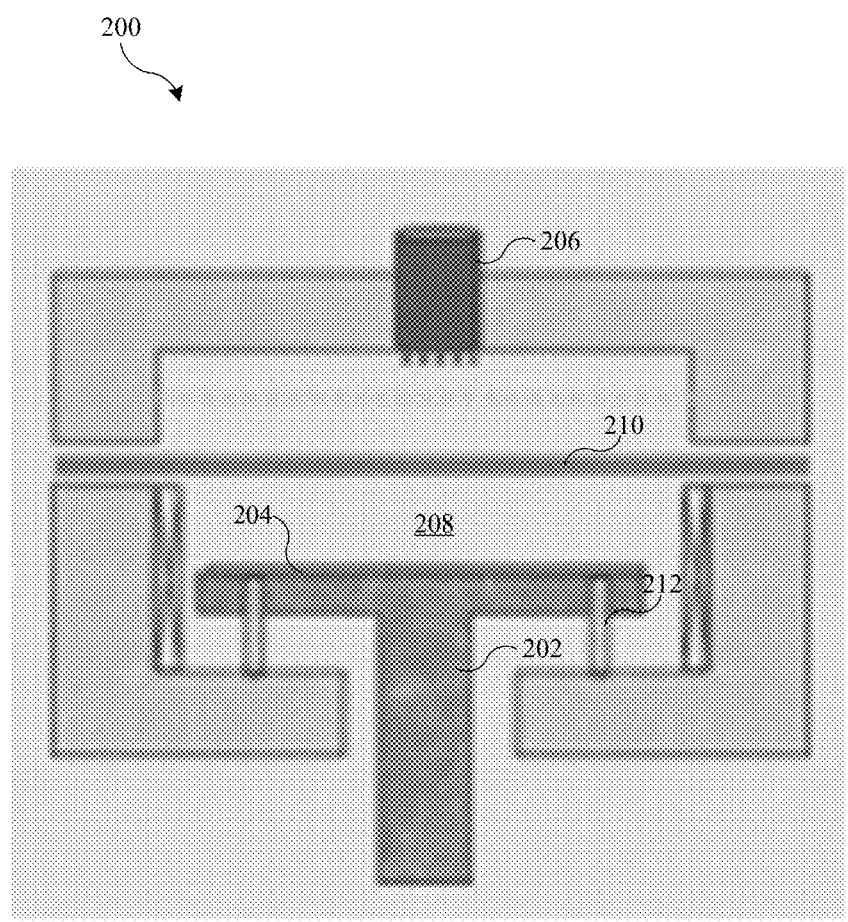
FIG. 2 shows a schematic cross-sectional view of an exemplary substrate treatment system according to embodiments of the present technology.

FIG. 2 shows an embodiment of one kind of processing chamber 200 that may be included in processing system 100. Processing chamber 200 is operable to perform one or more cleaning operations to remove oxide materials from the surface of a substrate incorporated into a device component for a SC-quantum computer. In embodiments, the processing chamber 200 provides a cleaning gas mixture that reacts and sublimates silicon oxide from the surface of a silicon substrate to leave a cleaned surface that is essentially oxygen free. In further embodiments, processing chamber 200 includes a substrate pedestal 202 upon which a substrate 204 is placed. In additional embodiments, processing chamber 200 includes a port 206 through which one or more process gases may be supplied to a substrate processing region 208 in contact with the substrate 204. In further embodiments, the processing chamber 200 includes a heating element 210 that may be operable to heat the surface of the substrate 204. In still further embodiments, the processing chamber 200 may include substrate lift pins 212 that are operable to lift the substrate off the substrate pedestal 202 towards the heating element 210.

In embodiments, the substrate 204 placed in processing chamber 200 may contain silicon. In further embodiments the silicon-containing substrate may include crystalline silicon and may be characterized by the volume resistivity of greater than or about 3000 Ωcm or more, greater than or about 3000 Ωcm or more, greater than or about 3000 Ωcm, greater than or about 3500 Ωcm, greater than or about 4000 Ωcm, greater than or about 4500 Ωcm, greater than or about 5000 Ωcm, or more. The silicon-containing substrate may have a surface coating of silicon oxide from exposure of the substrate to oxygen in the air. The silicon oxide coating may be removed by a cleaning operation in processing chamber 200 that includes exposing the silicon oxide coating to a fluorine-containing gas mixture supplied to the processing region 208. In embodiments, the fluorine-containing gas mixture reacts with the silicon oxide coating at reduced temperature while the substrate is in contact with the cooled substrate pedestal 202. The reaction forms a silicon-and-fluorine-containing solid that sublimates at temperatures greater than or about 100° C. In further embodiments, the lift pins 212 raise the substrate 204 with the silicon-and-fluorine-containing solid closer to the heating element 210. Positioning the substrate 204 closer to the heating element 210 raises the temperature of the silicon-and-fluorine-containing solid above its sublimation temperature and removes the solid from the surface of the substrate. The cleaned surface of the substrate 204 is characterized by a reduced amount of oxygen. In embodiments, the cleaned surface is oxygen free.

Figure 3:
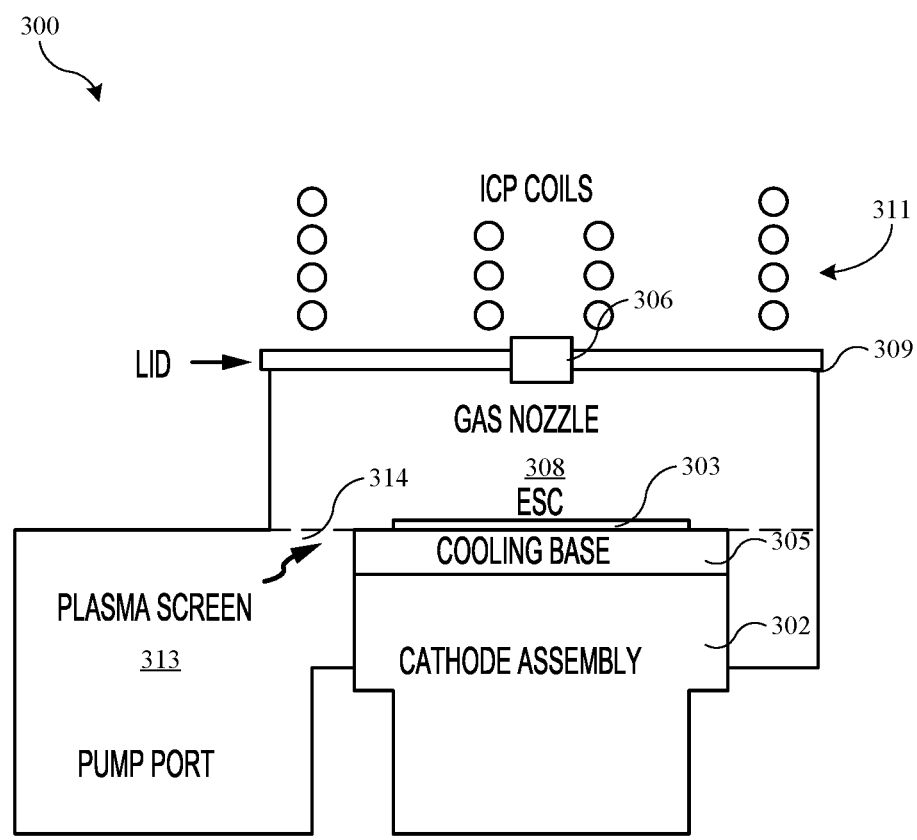
FIG. 3 shows a schematic cross-sectional view of another exemplary substrate treatment system according to embodiments of the present technology.

FIG. 3 shows an embodiment of another kind of processing chamber 300 that may be included in processing system 100. Processing chamber 300 is operable to perform one or more cleaning operations to remove oxide materials from the surface of a substrate incorporated into a device component for a SC-quantum computer. In embodiments, the processing chamber 300 generates a cleaning plasma that remove the oxide materials from the substrate surface to leave a cleaned surface that is essentially oxygen free. In further embodiments, processing chamber 300 includes a substrate pedestal 302 with an electrostatic chuck 303. A substrate (not shown) may be secured by the electrostatic chuck 303 in a substrate processing region 308 of the processing chamber 300. In yet further embodiments, the substrate pedestal 302 may include a cooling base 305 to reduce the temperature of a substrate in contact with the substrate pedestal to a temperature less than or about 25° C., less than or about 20° C., less than or about 15° C., less than or about 10° C., less than or about 5° C., less than or about 0° C., or less. In more embodiments, the substrate pedestal 302 may include a cathode assembly 305 that is operable to create an electric field which can attract ions in the cleaning plasma to the substrate positioned on the substrate pedestal 302.

In additional embodiments, the processing chamber 300 includes a port 306 though which one or more plasma precursors may be supplied to the substrate processing region 308. In more embodiments, the plasma precursors may include fluorine-containing precursors such as $F_2$ and $NF_3$, among other fluorine containing precursors. In yet more embodiments, the plasma precursors may include a combination of nitrogen trifluoride ($NF_3$) and ammonia ($NH_3$) that can react with the silicon oxide layer on the substrate to generate silicon-nitrogen-and-fluorine containing precursors that can be sublimated. In additional embodiments, the plasma precursors may include one or more reducing gases such as hydrogen gas ($H_2$). In embodiments, species generated by the reducing gas may react with the oxygen in an oxide layer on the substrate to form reduced oxygen-containing compounds that can be removed from the oxide layer. In further embodiments, the port 306 may be incorporated into a lid 309 that holds coils 311 operable to generate an induced coupled plasma from the plasma precursors in the substrate processing region 308. In more embodiments, the processing chamber may include a pump port 313 operable to remove the cleaning plasma effluents from the substrate processing region 308. In still more embodiments, a plasma screen 314 may be positioned between the substrate processing region 308 and the pump port 313 to prevent charged plasma species from entering the pump port from the substrate processing region.

In embodiments, a silicon oxide layer formed on a processing surface of a silicon-containing substrate placed in processing chamber 300 is exposed to a cleaning plasma formed in the substrate processing region 308. The cleaning plasma removes the silicon oxide layer from the surface of the silicon-containing substrate to leave a cleaned processing surface on the substrate with a reduced amount of oxygen. In embodiments, the cleaned processing surface is oxygen free.

Figure 4:
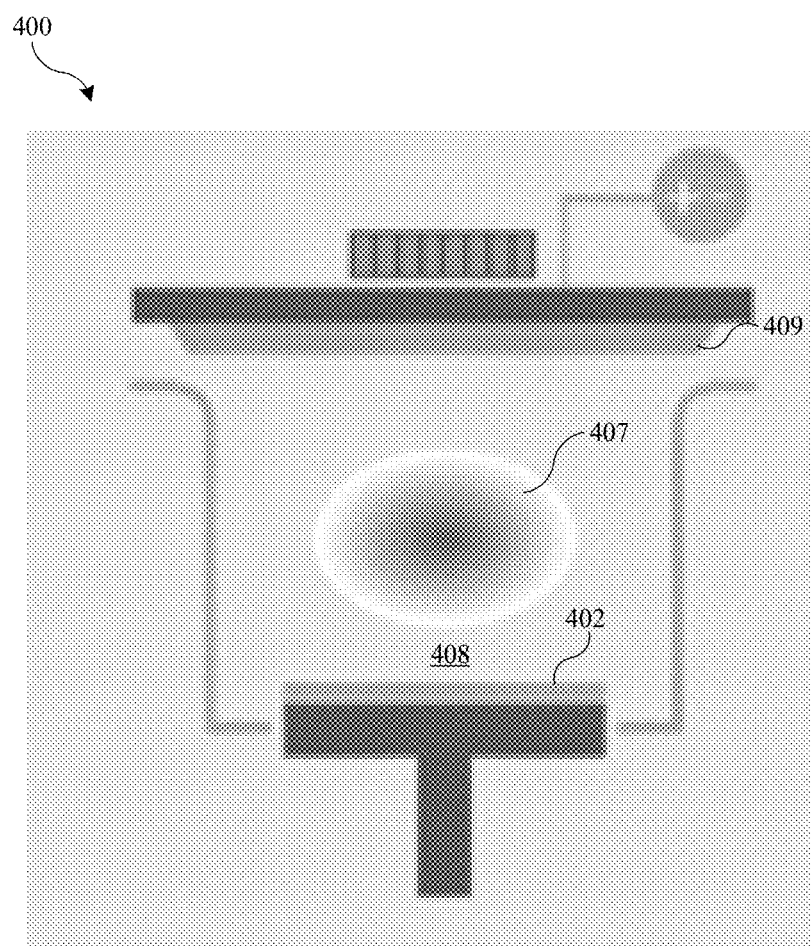
FIG. 4 shows a schematic cross-sectional view of an exemplary deposition system according to embodiments of the present technology.

FIG. 4 shows an embodiment of yet another kind of processing chamber 400 that may be included in processing system 100. Processing chamber 400 is operable to perform one or more deposition operations to form a metal layer on the cleaned surface of a substrate 402 incorporated into a device component for a SC-quantum computer. In some embodiments, the processing chamber 400 is operable to perform a physical vapor deposition and form the metal layer on the substrate 402. In additional embodiments, the processing chamber 400 is operable to perform a plasma-enhanced chemical vapor deposition and form the metal layer from a deposition plasma generated in the substrate processing region 408 of the processing chamber 400. In the embodiment shown in FIG. 4, the processing chamber 400 is operable to generate a sputtering plasma 407 with one or more ionic species that are coulombically accelerated into a target 409 that sputters one or more materials from the target into the substrate 402. In embodiments, the sputtering plasma 407 may be generated from one or more sputtering plasma gases such a helium, nitrogen, and argon, among other sputtering plasma gases. In more embodiments, the target may include at least one metal that is deposited as a metal layer on the substrate 402. In embodiments, the at least one metal may be aluminum, among other metals.

Figure 5:
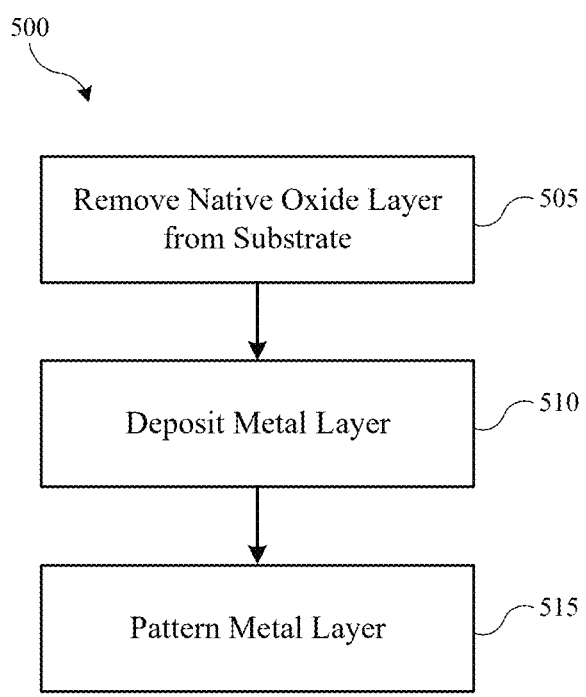
FIG. 5 shows a flowchart with selected operations of an exemplary method of fabricating quantum computer components according to embodiments of the present technology.

FIG. 5 shows a flowchart with selected operations of an exemplary method 500 of fabricating quantum computer components according to embodiments of the present technology. Method 500 will be described in conjunction with the development of a portion of an exemplary quantum computing component structure 600 shown in FIGS. 6A-C. In embodiments, component structure 600 forms part of a quantum computer component, such as a superconducting co-planar waveguide (CPW) resonator. In the embodiment shown in FIGS. 6A-C, the component structure 600 includes a cross-sectional view of a patterned metal layer 606 formed on a substrate 602. It should be appreciated that the additional layers may be formed below the substrate 602 and above the patterned metal layer 606.

Figure 6A:
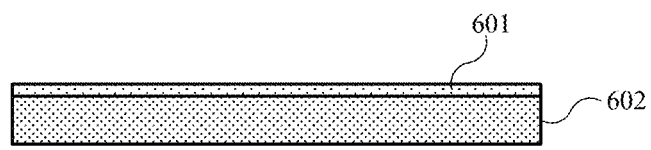
FIG. 6A-C show the development of a portion of an exemplary quantum computing component structure according to embodiments of the present technology.

Method 500 includes the removal of a native oxide layer 601, shown in FIG. 6A, from the substrate 602 in operation 505. In embodiments, the substrate 602 may be a silicon-containing substrate and the native oxide layer 601 may be a silicon oxide layer. In additional embodiments the silicon-containing substrate may include crystalline silicon and may be characterized by the volume resistivity of greater than or about 3000 Ωcm or more, greater than or about 3000 Ωcm or more, greater than or about 3000 Ωcm, greater than or about 3500 Ωcm, greater than or about 4000 Ωcm, greater than or about 4500 Ωcm, greater than or about 5000 Ωcm, or more. In still further embodiments, the native oxide layer 601 may be removed by reacting the silicon oxide layer with a cleaning gas mixture that forms a material from the oxide that can be vaporized or sublimated. In yet further embodiments, the native oxide layer 601 may be removed by an etching technique such as wet chemical etching, dry chemical etching, or plasma-enhanced etching, among other etching techniques. In embodiments, the removal operation 505 is operable to remove a percentage of the native oxide layer 601 that is greater than or about 90 wt. %, greater than or about 92.5 wt. %, greater than or about 95 wt. %, greater than or about 97.5 wt. %, greater than or about 99 wt. %, greater than or about 99.5 wt. %, greater than or about 99.9 wt. %, or more. In additional embodiments, the removal operation 505 removes all the native oxide layer 601 to form a cleaned surface of the substrate 602 that is substantially free of oxygen.

Figure 6B:

Method 500 further includes the deposition of a metal layer 604, shown in FIG. 6B, on the cleaned surface of the substrate 602 at operation 510. In embodiments, the metal layer 604 may include one or more metals such as aluminum. In additional embodiments, the metal layer 604 may be deposited to a thickness of greater than or about 25 nm, greater than or about 50 nm, greater than or about 75 nm, greater than or about 100 nm, or more.

In embodiments, the substrate 602 is not exposed to an oxygen-containing environment between the removal operation 505 and the deposition operation 510. This prevents the reaction of oxygen atoms and oxygen-containing molecules, radicals, and ions with the cleaned surface of the substrate 602 to form oxygen-containing compounds on the cleaned surface. In additional embodiments, the metal layer 604 is deposited on a surface of the substrate 602 that is characterized by a significantly reduced amount of oxygen compared to the starting substrate that includes the native oxide layer 601. In embodiments, the number of defects created by oxygen groups at the interface of the deposited metal layer 604 and the cleaned surface of the substrate 602 is reduced by greater than or about 90%, greater than or about 95%, greater than or about 99%, greater than or about 99.5%, greater than or about 99.9%, greater than or about 99.99%, greater than or about 99.999%, or more, compared to the starting substrate that includes the native oxide layer 601. The reduction in the number of defects created by oxygen groups reduces the number of two-level-systems that can cause a qubit to become unstable and drop out of a computational process in a quantum computer.

Figure 6C:
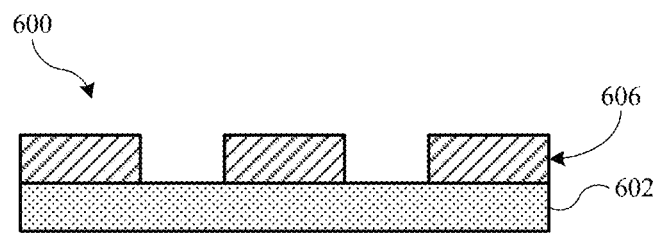

Method 500 still further includes patterning the aluminum layer 604 to form a patterned aluminum layer 606, shown in FIG. 6C, at operation 515. In embodiments, the patterning of the aluminum layer 604 may include forming and patterning a mask layer (not shown) on the surface of the aluminum layer 604 opposite the surface that forms an interface with the substrate 602. In further embodiments, an etching technique may be used to etch the portion of the aluminum layer that is exposed to an etchant by the patterned mask layer. In more embodiments, the etching techniques used to etch the exposed aluminum and form the patterned aluminum layer 606 may include reactive ion etching. After the formation of the patterned aluminum layer 606, the patterned mask layer may be removed from the component structure 600.

In embodiments, the forming and patterning of the mask layer may be done in a photomasking chamber included in the processing system 100. In further embodiments, the substrate 602 with the aluminum layer 604 may be moved from the deposition chamber for depositing the aluminum layer to the photomasking chamber in a low oxygen environment to reduce oxygen contact on the surface of the as-deposited aluminum layer. In still further embodiments, the deposition of the aluminum layer 604 and the deposition and patterning of the mask layer may be done in the same chamber, and the chamber may be kept under vacuum during both operations.

In additional embodiments, the patterned aluminum layer 606 may include one or more trenches formed in the aluminum layer. In further embodiments, a bottom side of the one or more trenches 608a-b may be formed from the surface of the substrate 602. In still further embodiments, the width of the trench that includes the substrate surface 610 in a bottom side may be characterized by a width of greater than or about 1 µm, greater than or about 2 µm, greater than or about 3 µm, greater than or about 4 µm, greater than or about 5 µm, or more. In still further embodiments, the bottom surface 610 of the trench formed by the substrate surface, and the sidewall surfaces 612a-b of the trench formed by the patterned aluminum layer 606 may be substantially free of oxygen during the patterning operation 515.

Figure 7:
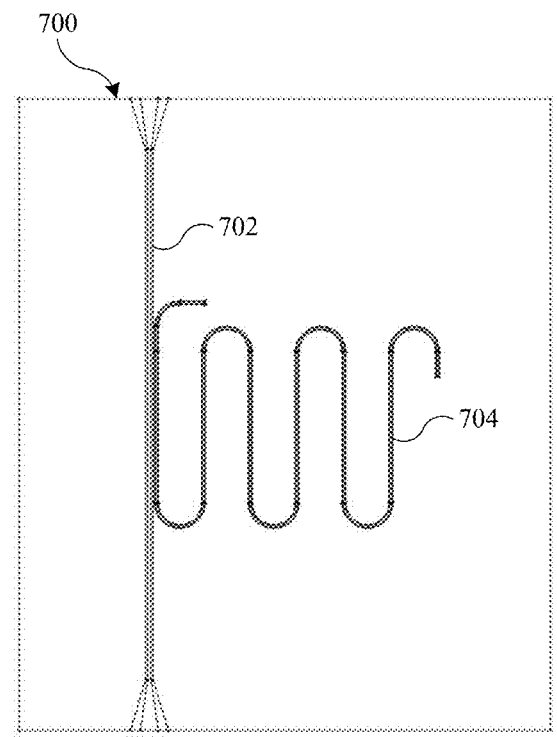
FIG. 7 shows a birds-eye view of an exemplary co-planar waveguide (CPW) resonator component of a quantum computer according to embodiments of the present technology.

FIG. 7 shows a birds-eye view of an exemplary co-planar waveguide (CPW) resonator component 700 of a quantum computer according to embodiments of the present technology. In the embodiment shown, the CPW component 700 includes an rf-coplanar feedline 702 and a co-planar waveguide resonator 704. In further embodiments, the co-planar waveguide resonator 704 may be a λ/4 CPW operable to generate a resonance frequency of greater than or about 5 GHz (e.g., ~5.08 GHz). In yet more embodiments, the co-planar waveguide resonator 704 may have open and short circuits terminating the ends of the CPW path.

Figure 8:
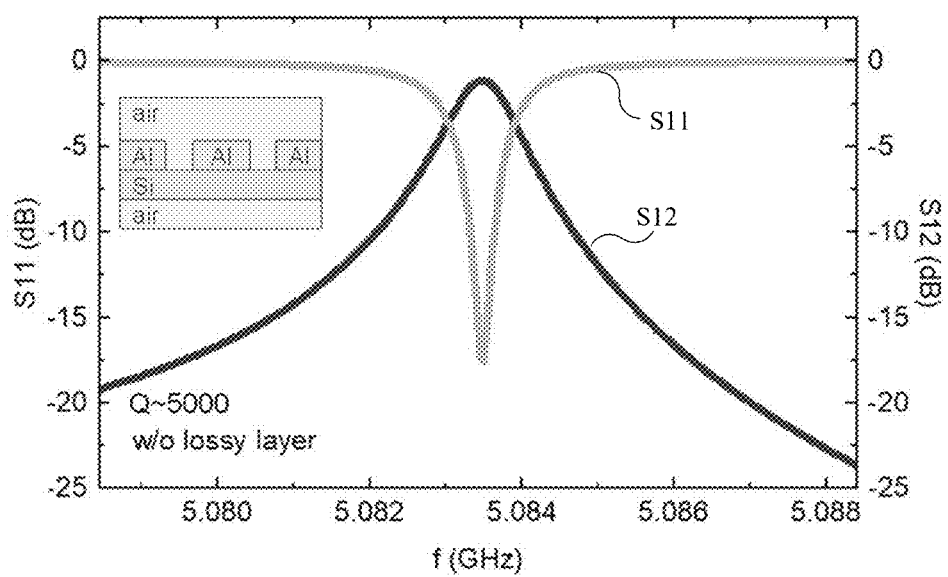
FIG. 8 shows a graph of a Q-factor for an CPW resonator component of a quantum computer according to embodiments of the present technology.

FIG. 8 is a graph plotting the S11 and S12 lines of photons generated by a CPW resonator according to embodiments of the present technology at frequencies ranging from 5.078 GHz to 5.088 GHz. The S11 line shows a sharp dip at the maxima of the S12 line, indicating a robust resonator capability in storing the rf energy of a qubit. The robust resonator capability in storing the rf energy is due at least in part to the reduced number of defects at the interface of the patterned aluminum layer and the silicon substrate in CPW resonator. The reduced number of defects is due to the present processing methods that remove oxides from the substrate and form metal layers on the cleaned substrate in the absence of oxygen and other species that create a lossy interface between the metal layer and the substrate. In embodiments, the reduced number of defects at the interface of the metal layer and the substrate increase the Q-factor of the CPW resonator. In additional embodiments, the CPW resonator may be characterized by a Q-factor of greater than or about 3000, greater than or about 4000, greater than or about 5000, or more.

Figure 9:
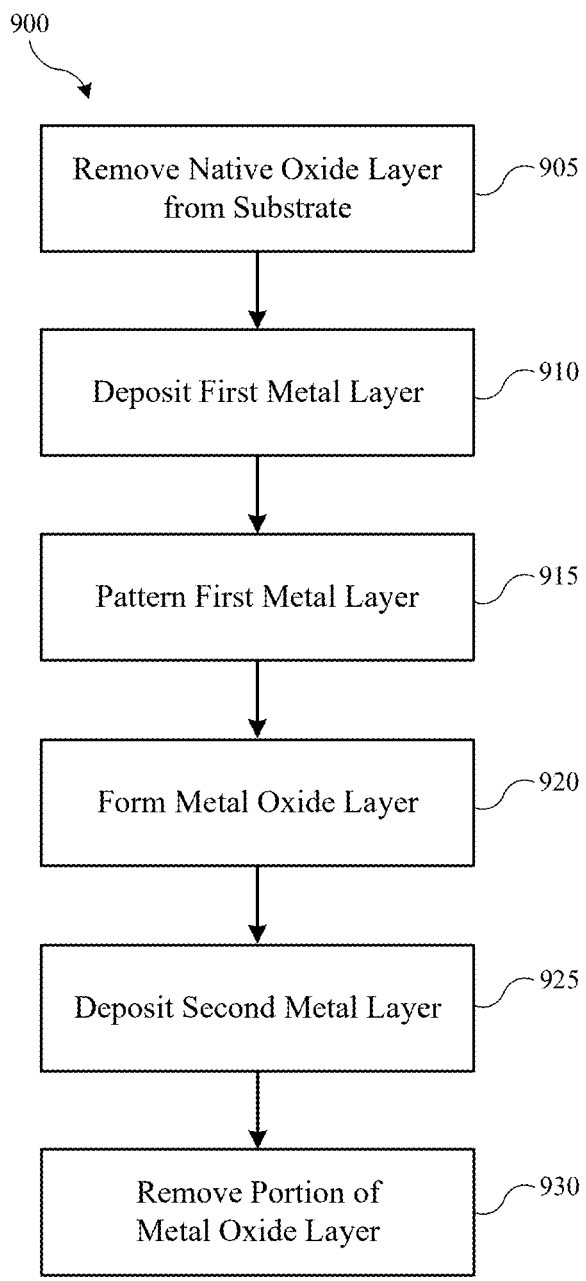
FIG. 9 shows a flowchart with selected operations of another exemplary method of fabricating quantum computer components according to embodiments of the present technology.

FIG. 9 shows a flowchart with selected operations of another exemplary method 900 of fabricating quantum computer components according to embodiments of the present technology. Method 900 will be described in conjunction with the development of a portion of an exemplary quantum computing component structure 1000 shown in FIGS. 10A-F. In embodiments, component structure 1000 forms part of a quantum computer component, such as a superconducting Josephson Junction (JJ). In the embodiment shown in FIGS. 10A-F, the component structure 1000 includes a cross-sectional view of first and second patterned metal layers 1006 and 1016 formed on a substrate 1002. It should be appreciated that the additional layers may be formed below the substrate 1002 and above the patterned metal layers 1006 and 1016.

Method 900 includes the removal of a native oxide layer (not shown) from the substrate 1002 in operation 905. In embodiments, the substrate 1002 may be a silicon-containing substrate and the native oxide layer may be a silicon oxide layer. In additional embodiments the silicon-containing substrate 1002 may include crystalline silicon and may be characterized by the volume resistivity of greater than or about 3000 Ωcm or more, greater than or about 3000 Ωcm or more, greater than or about 3000 Ωcm, greater than or about 3500 Ωcm, greater than or about 4000 Ωcm, greater than or about 4500 Ωcm, greater than or about 5000 Ωcm, or more. In still further embodiments, the native oxide layer may be removed by reacting the silicon oxide layer with a cleaning gas mixture that forms a material from the oxide that can be vaporized or sublimated. In yet further embodiments, the native oxide layer may be removed by an etching technique such as wet chemical etching, dry chemical etching, or plasma-enhanced etching, among other etching techniques.

Method 900 further includes the deposition of a metal layer 904, shown in FIG. 10A, on the cleaned surface of the substrate 1002 at operation 910. In embodiments, the metal layer 1004 may include one or more metals such as aluminum. In additional embodiments, the metal layer 1004 may be deposited to a thickness of greater than or about 25 nm, greater than or about 50 nm, greater than or about 75 nm, greater than or about 100 nm, or more.

In embodiments, the substrate 1002 is not exposed to an oxygen-containing environment between the removal operation 905 and the deposition operation 910. This prevents the reaction of oxygen atoms and oxygen-containing molecules, radicals, and ions with the cleaned surface of the substrate 1002 to form oxygen-containing compounds on the cleaned surface. In additional embodiments, the metal layer 1004 is deposited on a surface of the substrate 1002 that is characterized by a significantly reduced amount of oxygen compared to the starting substrate that includes the native oxide layer. In embodiments, the number of defects created by oxygen groups at the interface of the deposited metal layer 1004 and the cleaned surface of the substrate 1002 is reduced by greater than or about 90%, greater than or about 95%, greater than or about 99%, greater than or about 99.5%, greater than or about 99.9%, greater than or about 99.99%, greater than or about 99.999%, or more, compared to the starting substrate that includes the native oxide layer. The reduction in the number of defects created by oxygen groups reduces the number of two-level-systems that can cause a qubit to become unstable and drop out of a computational process in a quantum computer.

Method 900 still further includes patterning the aluminum layer 1004 to form a patterned aluminum layer 1006, shown in FIG. 10B, at operation 915. In embodiments, the patterning of the aluminum layer 1004 may include forming and patterning a mask layer (not shown) on the surface of the aluminum layer 1004 opposite the surface that forms an interface with the substrate 1002. In further embodiments, an etching technique may be used to etch the portion of the aluminum layer that is exposed to an etchant by the patterned mask layer. In more embodiments, the etching techniques used to etch the exposed aluminum and form the patterned aluminum layer 1006 may include reactive ion etching. After the formation of the patterned aluminum layer 1006, the patterned mask layer may be removed from the component structure 1000.

Method 900 also includes forming an aluminum oxide layer 1008, shown in FIGS. 10B-C, on the patterned aluminum layer 1006 at operation 920. In embodiments, the aluminum oxide layer 1008 may be formed by exposing the substrate 1002 and patterned aluminum layer 1006 to an oxygen-containing environment in a processing chamber that is part of system 100. In further embodiments, the aluminum oxide layer 1008 may be formed by physical vapor deposition of an oxygen containing gas or plasma on the patterned aluminum layer 1006. In still further embodiments, the substrate 1002 and patterned aluminum layer 1006 may be cleaned to remove any oxide materials formed on the exposed surfaces of the layers after the patterning of the aluminum layer 1004. In yet more embodiments, the aluminum oxide layer 1008 may be characterized by a thickness of less than or about 5 nm, less than or about 4 nm, less than or about 3 nm, less than or about 2 nm, less than or about 1 nm, or less. In still further embodiments, any silicon oxide formed on the exposed surfaces of the substrate 1002 during the formation of the aluminum oxide layer 1008 may be removed before the formation of additional aluminum layers on the exposed surfaces of the substrate.

Method 900 further includes depositing a second metal layer 1012, shown in FIGS. 10D-E, on the substrate 1002 and the aluminum oxide layer 1008 at operation 925. In embodiments, the second metal layer 1012 may include aluminum. In further embodiments, the second metal layer 1012 may have the same composition as the first aluminum layer 1004. In still further embodiments, the second metal layer 1012 may be a patterned metal layer that is deposited on a portion of substrate 1002 and the aluminum oxide layer 1008, as shown in FIG. 10E. In additional embodiments, the second metal layer 1012 may be patterned by depositing and patterning a photoresist layer on the substrate 1002 and the aluminum oxide layer 1008, blanketing the second metal layer on the patterned photoresist layer, and removing the portions of the second metal not in direct contact with the substrate 1002 or the aluminum oxide layer 1008. In yet additional embodiments, the removed portion of the second metal layer may be removed by reactive ion etching to form the patterned metal layer shown as second metal layer 1012.

In further embodiments, the second metal layer 1012 may be a patterned metal layer characterized by a thickness of greater than or about 25 nm, greater than or about 50 nm, greater than or about 75 nm, greater than or about 100 nm, or more. In yet further embodiments, the second metal layer 1012 may be a patterned metal layer that overlaps with a portion of the aluminum oxide layer 1008 and the patterned aluminum layer 1006 to form a portion of a Josephson Junction on the substrate 1002. In more embodiments, the second metal layer 1012 may be characterized by a width across the aluminum oxide layer 1008 of greater than or about 250 nm, greater than or about 300 nm, greater than or about 350 nm, greater than or about 400 nm, greater than or about 450 nm, greater than or about 500 nm, or more.

Method 900 also includes removing a portion of the aluminum oxide layer 1008, as shown in FIG. 10F, after the formation of the second metal layer 1012 in operation 930. In embodiments, the removed portion of the aluminum oxide layer 1008 may include portions of the layer that have not been covered by the formation of the second metal layer 1012. In further embodiments, the removal of the portion of the aluminum oxide layer 1008 may be done by one or more metal oxide cleaning techniques, including dry etching with a plasma.

Figure 11A:
FIGS. 11A-K show cross-sectional and birds-eye views of the development of a portion of still another exemplary quantum computing component structure according to embodiments of the present technology.

FIGS. 11A-K show the development of a portion of still another exemplary quantum computing component structure 1100 according to embodiments of the present technology. In embodiments, the component structure 1100 may be part of a superconducting Josephson Junction (JJ). FIG. 11A shows a first metal layer 1104 formed on a silicon substrate 1102. In additional embodiments, the first metal layer 1104 may be formed on a surface of the silicon substrate 1102 with a reduce amount of silicon oxide or that is free of silicon oxide. In further embodiments, the interface between the as-deposited first metal layer 1104 and the silicon substrate 1102 has significantly fewer defects capable of causing two-level-system defects for the quantum computing component structure 1100. In additional embodiments, the interface formed where the surface of the first metal layer 1104 contacts the surface of the substrate 1102 may be oxygen free. In further embodiments, the first metal layer 1104 may include aluminum.

Figure 11B:
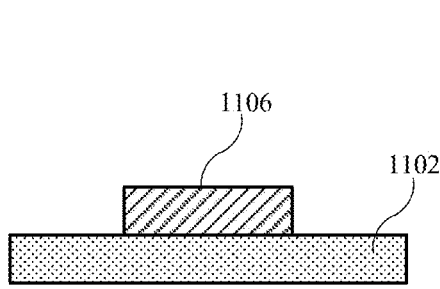
Figure 11C:
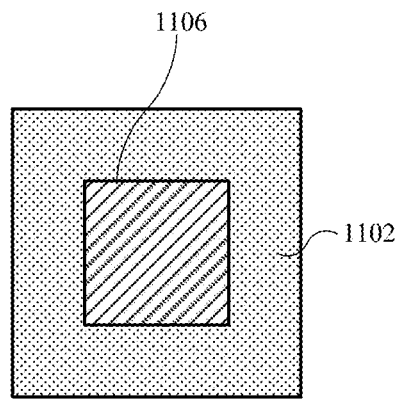

FIGS. 11B-C show cross-sectional and birds-eye views, respectively, of a patterned first metal layer 1106 on the substrate 1102. In embodiments, the first metal layer 1004 may be patterned by depositing and patterning a photoresist layer on the substrate 1102, blanketing the first metal layer on the patterned photoresist layer, and removing the portions of the first metal not in direct contact with the substrate 1002. In yet additional embodiments, the removed portion of the first metal may be removed by reactive ion etching to form the patterned metal layer shown as the patterned first metal layer 1106.

Figure 11D:
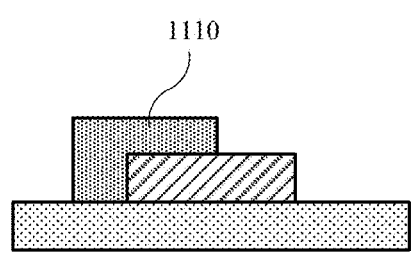
Figure 11E:
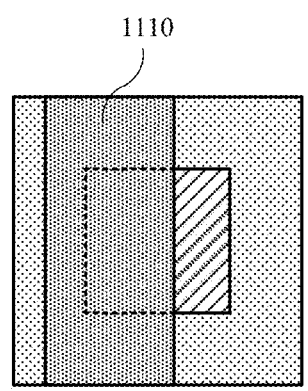

FIGS. 11D-E show cross-sectional and birds-eye views, respectively, of a sacrificial dielectric layer 1110 formed on portions of the patterned first metal layer 1106 and substrate 1102. The dielectric layer 1110 may be patterned by depositing and patterning a photoresist layer on the substrate 1102 and patterned first metal layer 1106, blanketing the dielectric layer on the patterned photoresist layer, and removing the portions of the dielectric material not in direct contact with the substrate 1002 and the patterned first metal layer 1106. In embodiments, the blanket dielectric layer may be formed by a dielectric deposition technique such as flowable chemical vapor deposition, and plasma enhance chemical vapor deposition, among other dielectric deposition techniques. In additional embodiments, the dielectric material may include silicon oxide or silicon nitride, among other kinds of dielectric material. In still further embodiments, the dielectric layer 1110 may be characterized by a thickness of greater than or about 50 nm, greater than or about 100 nm, greater than or about 150 nm, greater than or about 200 nm, greater than or about 250 nm, or more.

Figure 11F:
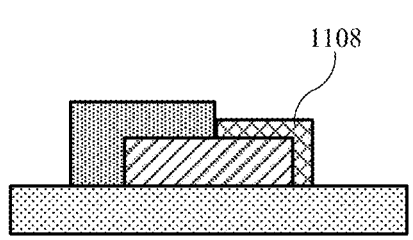
Figure 11G:
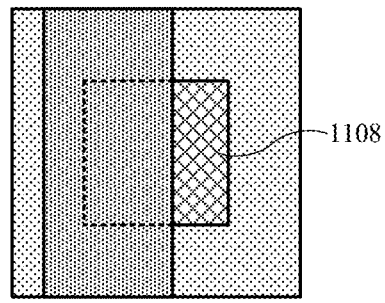

FIGS. 11F-G show cross-sectional and birds-eye views, respectively, of a metal oxide layer 1108 formed on the portion of the patterned first metal layer 1106 that is not covered by the dielectric layer 1110. In embodiments, the metal oxide layer 1108 may be formed by exposing the uncovered portion of the patterned first metal layer 1106 to an oxygen-containing environment in a processing chamber that is part of system 100. In further embodiments, the metal oxide layer 1108 may be formed by physical vapor deposition of an oxygen containing gas or plasma on the patterned first metal layer 1106. In still further embodiments, the substrate 1102 and uncovered portion of the patterned first metal layer 1106 may be cleaned to remove any oxide materials formed on the exposed surfaces of the layers after the patterning of the aluminum layer 1104. In additional embodiments, the metal oxide layer 1108 may include aluminum oxide. In yet more embodiments, the metal oxide layer 1108 may be characterized by a thickness of less than or about 5 nm, less than or about 4 nm, less than or about 3 nm, less than or about 2 nm, less than or about 1 nm, or less. In still further embodiments, any silicon oxide formed on the exposed surfaces of the substrate 1102 during the formation of the dielectric layer 1110 and the metal oxide layer 1108 may be removed before the formation of additional metal layers on the exposed surfaces of the substrate.

Figure 11H:
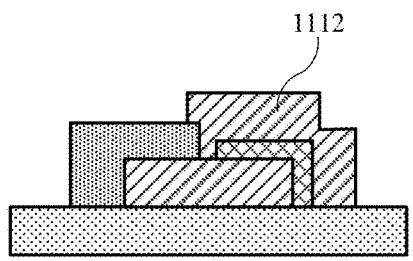
Figure 11I:
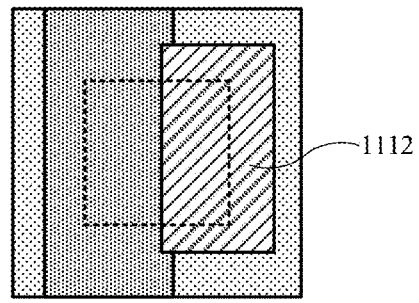

FIGS. 11H-I show cross-sectional and birds-eye views, respectively, of a second metal layer 1112 formed on the portion of the patterned first metal layer 1106 that is not covered by the dielectric layer 1110 and may also be formed on a portion of the substrate 1102. In embodiments, the second metal layer 1112 may include aluminum. In further embodiments, the second metal layer 1112 may have the same composition as the first aluminum layer 1104. In still further embodiments, the second metal layer 1112 may be a patterned metal layer that is deposited on a portion of substrate 1102 and the metal oxide layer 1108, as shown in FIGS. 11I. In yet more embodiments, a portion of the second metal layer 1112 may also extend between the dielectric layer 1110 and the metal oxide layer 1108 to make direct contact with the patterned first metal layer 1106. In additional embodiments, the second metal layer 1112 may be patterned by depositing and patterning a photoresist layer on the substrate 1102 and the patterned metal oxide layer 1108, blanketing the second metal layer on the patterned photoresist layer, and removing the portions of the second metal not in direct contact with the substrate 1102 or the metal oxide layer 1108. In yet additional embodiments, the removed portion of the second metal layer may be removed by reactive ion etching to form the patterned metal layer shown as second metal layer 1112. In more embodiments, the interface where the second metal layer 1112 and the substrate 1102 make contact may be oxygen free. In still more embodiments, the interface between the second metal layer 1112 and the patterned first metal layer 1106 may be oxygen free.

Figure 11J:
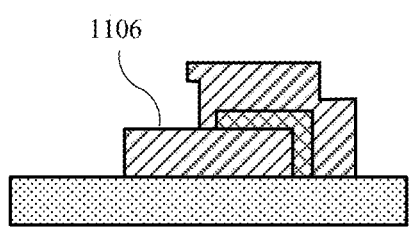
Figure 11K:
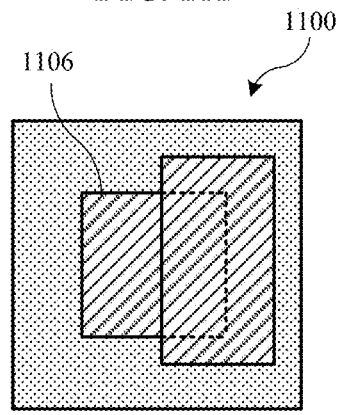

FIGS. 11J-K show cross-sectional and birds-eye views, respectively, of the component structure 1100 after the removal of the sacrificial dielectric layer 1110 from the structure. In embodiments, the dielectric layer 1110 may be removed by a removal technique such as wet etching, or dry etching, among other removal techniques for dielectric material. The portion of component structure 1100 that is formed after the removal of the dielectric layer 1110 may be a portion of a high-quality Josephson Junction (JJ) that is characterized by significantly fewer two-level-system (TLS) defects at the interfaces of the patterned first metal layer 1106 and the second metal layer 1112 with the oxide layer 1108. The reduced number of TLS defects reduces the impact of a significant decoherence mechanism for qubits in a quantum computer system that includes the present JJs.

Embodiments of the present technology provide quantum computing components with reduced numbers of two-level-system (TLS) defects that cause the decoherence of qubits in the quantum computer. The present technology realizes these more stable quantum computing components by forming interfaces under controlled conditions between the surfaces of a substrate, metal layers, and oxide layers. In embodiments, these interfaces have fewer TLS defects that are caused by contaminants on the surfaces, such as oxygen groups at the interface of a substrate and metal layer. Among other benefits, the processing methods of the present technology permit the fabrication of quantum computing components with increased fault tolerance and more scalable computational capabilities.

In the preceding description, for the purposes of explanation, numerous details have been set forth to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a material" includes a plurality of such materials, and reference to "the precursor" includes reference to one or more precursors and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

The invention claimed is:

1. A processing method to form a device component, the processing method comprising:
 removing native oxide from a deposition surface of a silicon substrate in a cleaning chamber of a processing system;
 transferring the silicon substrate under vacuum to a deposition chamber of the processing system;
 depositing an aluminum layer on the deposition surface of the silicon substrate in the deposition chamber, wherein an interface between the aluminum layer and the deposition surface of the silicon substrate is oxygen free;
 forming a patterned photoresist layer on the aluminum layer, wherein the patterned photoresist layer comprises patterned openings that provide access to an exposed portion of the aluminum layer;

removing the exposed portion of the aluminum layer down to the silicon substrate to form a patterned aluminum layer;

removing the patterned photoresist layer from the patterned aluminum layer;

removing native aluminum oxide from an exposed surface of the patterned aluminum layer, wherein the removal of the native aluminum oxide forms a cleaned patterned aluminum layer that is free of oxygen on the exposed surface of the patterned aluminum layer; and forming an aluminum oxide layer on the cleaned patterned aluminum layer in the deposition chamber.

2. The processing method of claim 1, wherein the method further comprises:

providing a pretreated silicon substrate to a degassing chamber of the processing system to form a degassed silicon substrate;

transferring the degassed silicon substrate under vacuum to a cooling chamber of the processing system to cool the silicon substrate; and transferring the silicon substrate under vacuum to the cleaning chamber of the processing system.

3. The processing method of claim 1, wherein the method further comprises forming the patterned aluminum layer into the device component, wherein the device component is a co-planar waveguide resonator.

4. The processing method of claim 1, wherein the method further comprises: providing the silicon substrate with the patterned aluminum layer to the cleaning chamber of the processing system transferring the silicon substrate with the cleaned patterned aluminum layer under vacuum to the deposition chamber of the processing system; and forming a second aluminum layer on the aluminum oxide layer in the deposition chamber, wherein the silicon substrate stays in the deposition chamber for both the forming of the aluminum oxide layer and the forming of the second aluminum layer.

5. The processing method of claim 4, wherein the second aluminum layer is also formed directly on the silicon substrate, and wherein an interface between the second aluminum layer and the silicon substrate is oxygen free.

6. The processing method of claim 4, wherein the method further comprises forming the silicon substrate having the second aluminum layer into the device component, wherein the device component is a Josephson Junction.

7. A processing method to form a device component, the processing method comprising:

removing native oxide from a deposition surface of a silicon substrate in a cleaning chamber of a processing system;

transferring the silicon substrate under vacuum to a deposition chamber of the processing system;

depositing a first aluminum layer on the deposition surface of the silicon substrate in the deposition chamber, wherein an interface between the first aluminum layer and the deposition surface of the silicon substrate is oxygen free;

patterning the first aluminum layer to form a first patterned aluminum layer;

forming and patterning a patterned dielectric layer on the first patterned aluminum layer and the silicon substrate;

forming an aluminum oxide layer on the first patterned aluminum layer, wherein the aluminum oxide layer is not formed on the first patterned aluminum layer that is covered by the patterned dielectric layer;

forming a second aluminum layer on the aluminum oxide layer and the patterned dielectric layer, wherein the silicon substrate stays in the deposition chamber for both the forming of the aluminum oxide layer and the forming of the second aluminum layer; and removing the patterned dielectric layer from the silicon substrate, wherein the removal of the patterned dielectric layer forms a second patterned aluminum layer from the second aluminum layer.

8. The processing method of claim 7, wherein the second aluminum layer is also formed directly on the silicon substrate, and wherein an interface between the second aluminum layer and the silicon substrate is oxygen free.

9. The processing method of claim 7, wherein the method further comprises forming the silicon substrate having the second aluminum layer into the device component, wherein the device component is a Josephson Junction.

10. The processing method of claim 7, wherein the first aluminum layer and the second aluminum layer are formed by physical vapor deposition.

11. The processing method of claim 7, wherein the patterning of the first aluminum layer to form the first patterned aluminum layer includes reactive ion etching of the first aluminum layer.

12. The processing method of claim 7, wherein the patterned dielectric layer comprises a silicon oxide or silicon nitride layer that is formed on the first patterned aluminum layer by physical vapor deposition or flowable chemical vapor deposition.

13. The processing method of claim 7, wherein the patterning of the first aluminum layer includes forming a photoresist layer on the first aluminum layer and patterning the photoresist layer, wherein the photoresist layer comprises a carbon-containing hardmask.

* * * * *